United States Patent [19]

Hicks

[11] Patent Number: 4,590,057
[45] Date of Patent: May 20, 1986

[54] PROCESS FOR THE GENERATION OF CHLORINE DIOXIDE

[75] Inventor: Bruce W. Hicks, Rio Linda, Calif.

[73] Assignee: Rio Linda Chemical Co., Inc., Sacramento, Calif.

[21] Appl. No.: 651,167

[22] Filed: Sep. 17, 1984

[51] Int. Cl.$^4$ ............................................. C01B 11/02
[52] U.S. Cl. .................................................. 423/477
[58] Field of Search ......................................... 423/477

[56] References Cited

U.S. PATENT DOCUMENTS 4,247,531 1/1981 Hicks .................................. 423/477

FOREIGN PATENT DOCUMENTS 1467204 11/1969 Fed. Rep. of Germany ...... 423/477

Primary Examiner—John Doll
Assistant Examiner—Jeffrey E. Russel
Attorney, Agent, or Firm—Leonard Bloom

[57] ABSTRACT

Process for the generation of chlorine dioxide by the essentially instantaneous reaction of a relatively concentrated aqueous solution of a metal chlorite and an oxidizing agent, preferably gaseous chlorine. The reaction is carried out in a generator having a mix and dwell premix chamber interconnected with a source of vacuum, preferably a venturi. The relatively concentrated aqueous metal chlorite solution and the oxidizing agent are allowed to mix and react in the premix chamber prior to any dilution as, for example, by water or other fluid flowing through the venturi eductor to deliver the generated chlorine dioxide to storage or utilization. When the oxidizing agent is chlorine, it is preferred for the chlorine stream to contain some bleed water in an amount below that which would significantly dilute the reactants and thereby have a quenching effect on the reaction. The presence of bleed water prevents a buildup of metal chloride on the chlorine inlet to the premix chamber.

10 Claims, 2 Drawing Figures

PROCESS FOR THE GENERATION OF CHLORINE DIOXIDE

BACKGROUND OF THE INVENTION

This invention relates to a process for the production of chlorine dioxide.

Chlorine dioxide is utilized in a variety of processes, including a large number of bactericidal applications, especially in the fields of water treatment and odor abatement. Its usage is continuing to grow for many reasons. Due to the unstable nature of gaseous chlorine dioxide when compressed, it is necessary to produce chlorine dioxide on site rather than to produce it at a plant and ship it for usage when and where needed.

The prior art discloses a variety of different types of chlorine dioxide generators, most of which comprise elongated glass or plastic columns of various constructions. Reference is made, for instance, to U.S. Pat. No. 4,013,761 and to U.S. Pat. No. 3,502,443.

All of the prior art chlorine dioxide generators which employ columns tend to be large and bulky. They require the use of chemical feed pumps to meter in the raw materials utilized for the process. One of the problems associated with such prior art chlorine dioxide generators is the inadequacy of the mixing to achieve reaction of the raw materials being employed to produce chlorine dioxide.

My U.S. Pat. No. 4,247,531 titled "Chlorine Dioxide Generation Apparatus and Process" discloses apparatus and process whereby chlorine dioxide is generated by the essentially instantaneous reaction of a relatively concentrated aqueous solution of chlorine dioxide precursors, preferably a metal chlorite and an oxidizing agent which is preferably gaseous chlorine. This discovery has greatly simplified chlorine dioxide generation and reduced the size of the reactors while at the same time producing high yields of chlorine dioxide. The reaction is carried out in a small generator having a mix and dwell premix chamber interconnected with a source of vacuum, preferably a venturi. The relatively concentrated aqueous metal chlorite solution and the oxidizing agent are allowed to mix and react in the premix chamber prior to any dilution as, for example, by water or other fluid flowing through the venturi eductor to deliver the generated chlorine dioxide to storage or utilization. In order to achieve the essentially instantaneous reaction of the relatively concentrated aqueous solution of metal chlorite and gaseous chlorine, it is critical that the reactants, either before entering the reaction zone or while in the reaction zone, not be diluted by any diluent, for example water, in an amount sufficient to have a quenching effect on the reaction. At column 9, lines 40–48 of U.S. Pat. No. 4,247,531, it is taught that when the aqueous metal chlorite solution has a concentration above about 10%, or even when diluted to somewhat less than 10%, excellent results are obtained. It is important that the metal chlorite solution, initially and in the reaction zone, be more concentrated than the approximately 1% aqueous metal chlorite solutions of the prior art.

When the relatively concentrated aqueous metal chlorite solution and gaseous chlorine are reacted in the chlorine dioxide generator described in U.S. Pat. No. 4,247,531, there is a tendency for deposits of solid metal chloride to build up on the chlorine inlet to the premix chamber of the generator. As shown in the equation below, sodium chloride is a by product of the reaction of a metal chlorite and chlorine. Any aqueous metal chlorite in the vicinity of the inrushing dry chlorine gas would be reduced to metal chloride. Because of the dry gas entering the reactor at relatively high velocity, the metal chloride is dried into crystals on the chlorine inlet that eventually block the free flow of the gaseous chlorine. Accordingly, in the practice of this invention, the gaseous chlorine stream contains some bleed water in an amount below that which would significantly dilute the reactants and thereby have a quenching effect on the reaction. The presence of bleed water prevents a buildup of metal chloride on the chlorine inlet to the premix chamber.

SUMMARY OF THE INVENTION

The process of this invention consists of a method for the generation of chlorine dioxide comprising the essentially instantaneous reaction of a relatively concentrated aqueous solution of a metal chlorite and gaseous chlorine in a reaction zone sized to permit substantially instantaneous contact of the reactants and wherein the gaseous chlorine contains bleed water in an amount below that which would significantly dilute the reactants and thereby have a quenching effect on the reaction. The presence of bleed water in the gaseous chlorine prevents the buildup of deposits of solid metal chloride on the chlorine inlet to the reaction zone.

It is therefore an object of this invention to provide a process for the generation of chlorine dioxide by the reaction of a relatively concentrated aqueous metal chlorite solution and gaseous chlorine.

It is another object of this invention to provide a process for the generation of chlorine dioxide by the reaction of a relatively concentrated aqueous metal chlorite solution and gaseous chlorine in a reaction zone sized to permit substantially instantaneous contact and reaction of the reactants and which permits rapid removal of generated chlorine dioxide.

It is yet another object of this invention to provide a process for the generation of chlorine dioxide by the reaction of a relatively concentrated aqueous metal chlorite solution and gaseous chlorine wherein said gaseous chlorine contains bleed water.

Still other objects will become apparent from the following description and drawings.

The foregoing and other objects are accomplished by the practice of this invention. Broadly, viewed in one of its principal aspects, this invention consists of a process for the generation of chlorine dioxide comprising the steps:

1. Substantially instantaneously reacting a relatively concentrated aqueous solution of a metal chlorite and gaseous chlorine in a reaction zone sized to permit substantially instantaneous reaction of said reactants and wherein said gaseous chlorine contains bleed water in an amount below that which would significantly dilute the reactants and thereby have a quenching effect on the reaction; and
2. Transferring the generated chlorine dioxide from said reaction zone to another location by immediately educting said chlorine dioxide by suction generated by the movement of a diluting fluid through a venturi, the flow rate of said diluting fluid being correlated to the flow rate of the reactants to thereby avoid any buildup of chlorine dioxide in said reaction zone.

The instant invention thus provides a process for the generation of chlorine dioxide by the essentially instantaneous reaction of a relatively concentrated aqueous solution of a metal chlorite and an oxidizing agent, preferably gaseous chlorine, in a reaction zone sized to permit substantially instantaneous contact of reactants. The invention is characterized by the absence of a buildup of solid metal chloride deposits on the chlorine inlet to the reaction zone. The reaction is carried out in a generator having a mix and dwell premix chamber interconnected with a source of vacuum, preferably a venturi. The relatively concentrated aqueous metal chlorite solution and the gaseous chlorine are allowed to mix and react in the premix chamber prior to any dilution as, for example, by water or other fluid flowing through the venturi eductor to deliver the generated chlorine dioxide to storage or utilization. The gaseous chlorine contains bleed water in an amount below that which would significantly dilute the reactants and thereby have a quenching effect on the reaction. The presence of bleed water prevents a buildup of metal chloride on the chlorine inlet to the premix chamber.

The nature and substance of the present invention as well as its objects and advantages will be more clearly perceived and fully understood by referring to the following description and claims taken in connection with the accompanying drawings which are described briefly below.

DESCRIPTION OF THE PREFERRED EMBODIMENTS

In accordance with the practice of this invention, there is provided a process for the preparation of chlorine dioxide which process employs a reaction vessel comprising a vacuum eductor having a "T" shaped premix chamber in fluid communication with the low pressure zone, i.e., beyond the throat of the venturi of the eductor. A "T" shaped premix chamber includes inlet means for an aqueous metal chlorite solution and the gaseous chlorine at opposite ends of the portion of the "T" normal to the venturi throat, a dwell chamber or contact area in fluid comminication therewith terminating in an outlet to the low pressure zone beyond the throat of the venturi for admixture with water being drawn through said venturi for mixture with the chlorine dioxide reaction product of metal chlorite and chlorine. Included in the system are means for introducing bleed water into the pipe conducting chlorine into the premix chamber.

Figure 2:
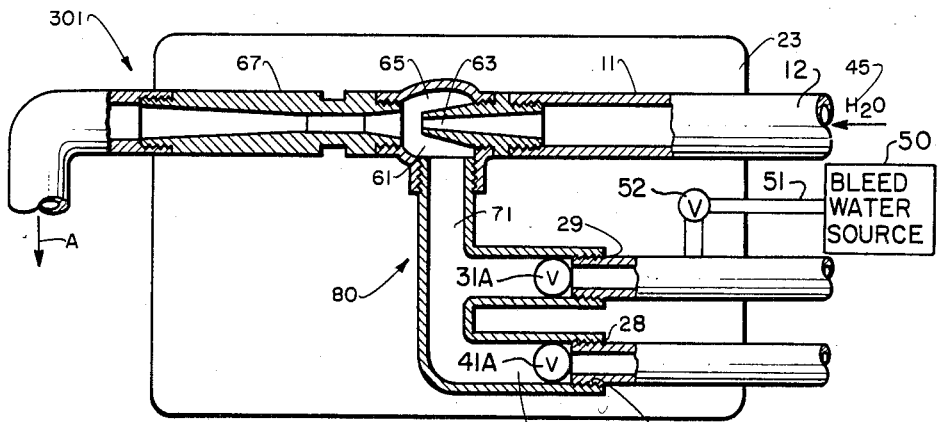
FIG. 2 illustrates an alternate configuration for the premix chamber of FIG. 1.

While a "T" shaped premix chamber is preferred due to ease of availability in the marketplace, other configurations such as that of the embodiment of FIG. 2 may also be employed. These configurations also feature inlet ports and lines in a main body section and a contact zone, also in said main body section. The chamber is in fluid communication with an eductor for removing generated chlorine dioxide and transporting it to storage or utilization.

The chlorine dioxide generation system of this invention is best understood by reference to the accompanying drawings. In the embodiment illustrated in FIG. 1, wherein 100 designates the chlorine dioxide generator in general, generator 100 is shown attached by suitable means (not illustrated) to mounting board 23. The apparatus comprises the combination of an eductor 11 with a premix chamber 20 forming generator 100.

Eductor 11 includes an inlet 12 for the delivery of generated chlorine dioxide by water 45 which passes through said eductor 11. The chlorine dioxide dissolved in water is designated by arrow A. This combination is delivered through other piping (not shown) a short distance in concentrated form to water or other material to be treated, for example, waste in a sewage plant. The concentrated end product is shown by arrow A exiting eductor outlet 67. There is provided a restricted area or venturi throat 63 which creates a low pressure zone 65 downstream thereform and in fluid communication therewith. More details are recited below.

Also in fluid communication with eductor 11 is "T" shaped premix chamber 20 which may be mounted as desired to mounting board 23, either alone or, as shown here, below the throat but always in direct fluid communication with low pressure zone 65. The premix chamber is also called a prereaction chamber.

"T" 20 includes inlet ports 41 and 31 for the introduction of reactants. The ports are each sealed off from the environment by check valves 41A and 31A, respectively. A contact area 21 and an outlet 61 are also provided. Outlet 61 is in fluid communication with low pressure zone 65 of eductor 11.

Chlorite ion source 18 is connected by pipeline 28 to inlet port 41 through rotometer 16. Gaseous chlorine source 17 is connected in like manner via pipe 29 and rotometer 15 to port 31. Bleed water source 50 is connected by pipe 51 to pipe 29 through rotometer 53 just upstream from inlet port 31. Check valve 52 is located on pipe 51.

Figure 1:
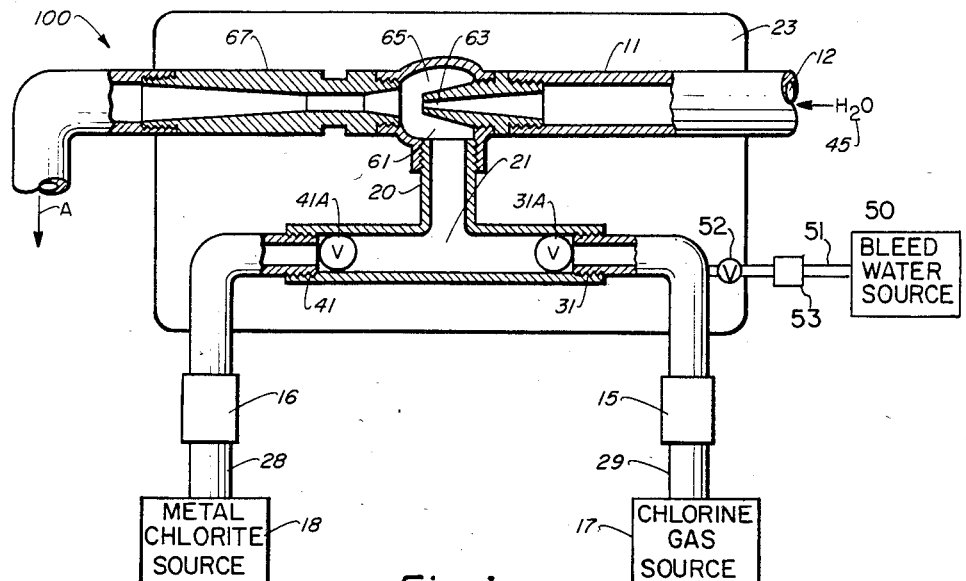
FIG. 1 illustrates one embodiment of the apparatus of the present invention wherein a relatively concentrated aqueous metal chlorite solution and gaseous chlorine are employed for the generation of chlorine dioxide.

In the embodiment illustrated in FIG. 1, the two reactants are seen to move inwardly from opposite ends of the elongated portion of the "T", shown here horizontally disposed. No criticality is seen as to which reactant enters from which side. In FIG. 2 is found an alternate embodiment of the premix chamber shown in FIG. 1. In the embodiment of FIG. 2, wherein 301 designates the chlorine dioxide generator in general, generator 301 is shown attached by suitable means (not illustrated) to mounting board 23. The premix chamber of FIG. 2 is shaped like an inverted letter "F". Since like numbers denote like parts, certain items will not be redescribed. Thus, the embodiment of FIG. 2 features premix chamber 80 wherein the contact area 71 denotes the location in the chamber wherein incoming ingredients 28 and 29 mix in the absence of sufficient water to quench the reaction to thereby react and form chlorine dioxide.

The reaction of gaseous chlorine with concentrated aqueous sodium chlorite solutions has to some degree been utilized in the past. U.S. Pat. Nos. 2,131,447; 2,388,202; and 2,043,284 disclose such methods. However, all of these methods utilize chlorine gas under pressure and use air or an inert gas to dilute and/or strip the chlorine dioxide gas product from the system. Chlorine gas pressure feed systems are rarely used today because of safety problems; they are now being replaced by demand regulators. Also, these methods involve the more cumbersome elongated reaction towers or complicated recirculating pump systems that are costly and prone to maintenance problems. All of these methods suffer from the possibility of over production of chlorine dioxide as well as the handling of gaseous chlorine dioxide, which is very dangerous and prone to explosion. They also fail to achieve the very rapid reaction rate obtained in accordance with the process disclosed in U.S. Pat. No. 4,247,531. However, by using the present invention, safe explosion-proof chlorine dioxide generation is accomplished. By using the premix "T" of this invention with a venturi, or any suction device, the vacuum thus created evacuates all of the chlorine dioxide generated as well as all of the liquid. The apparatus educts the sodium chlorite solution, the bleed water and the chlorine gas at the same time. This provides the added safety feature that if the vacuum power source stops, or if the vacuum line is broken, all chlorine dioxide generation stops. This prevents over production of chlorine dioxide, which could result in an explosion. Moreover, the present invention provides an improvement over my invention described in U.S. Pat. No. 4,247,531. In the instant invention, the chlorine gas stream contains bleed water which prevents the buildup of metal chloride deposits on the chlorine inlet to the premix chamber.

It has been found that by allowing the reactants to premix prior to mixing with water from the eductor or the dilution associated with delivery to the place of utilization, greater efficiency will result with a higher rate of conversion to chlorine dioxide. The higher conversion rates can best be understood by reference to the following nonlimiting examples. The examples illustrate the process of this invention which requires the instantaneous prereaction of the concentrated aqueous metal chlorite solution and gaseous chlorine prior to dilution with the educting water.

The chemical equations for the generation of chlorine dioxide by the process of this invention are as follows:

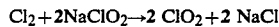

$$Cl_2 + 2NaClO_2 \rightarrow 2\ ClO_2 + 2\ NaCl$$

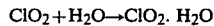

$$ClO_2 + H_2O \rightarrow ClO_2 \cdot H_2O$$

While water 45 is shown as the vacuum forming diluent, any fluid which does not react with and which is compatible with chlorine dioxide may be employed. Thus, an inert gas such as nitrogen can be employed to remove the reaction products, primarly chlorine dioxide, to a location of either short term storage or actual end use.

In the embodiment of FIG. 2, threads 69 are depicted to show that it is within the scope of the invention to attach threaded pipes or lines from sources of the reactants to the female threads 69 of the premix chamber 80. Check valves 31A and 41A are also employed.

Referring to FIG. 2, it is seen that an ingredient, e.g., a concentrated aqueous metal chlorite solution, enters port 28 and proceeds down inlet pipe 68 into premix chamber 80. The ingredient moves through a section of the premix chamber 80 along with chlorine to the contact zone, a location where all of the reactants can mix and react together to form chlorine dioxide. The location of contact area 71 is seen to be upstream from exit 61 into the eductor and downstream from the point of entrance of the reactants being employed.

While not shown in FIG. 2 for ease of understanding, the use of rotometers or other valves is contemplated for this embodiment as well as that of FIG. 1.

As mentioned previously, water 45 or some other fluid should be employed to move the chlorine dioxide from the contact area through the eductor. Obviously, any compatible fluid, liquid or gaseous, that will not react with the chlorine dioxide may be employed. For example, steam or nitrogen may be used. The flow rate of the moving fluid 45 should be such that for a given feed rate of reactants, the moving fluid is able to remove all of the chlorine dioxide generated so that a buildup of product is avoided. Thus, for water, the cheapest and probably easiest fluid to use, the flow rate should be such as to exhaust and absorb substantially all of the chlorine dioxide. This rate is readily determinable since it is known that the solubility of chlorine dioxide in water at room temperature is about 2,900 ppm. It has also been determined that an operable vacuum range for any of the embodiments of this invention is within the range of about 5 to about 30 inches of mercury. Accordingly, it is within the skill of the art to adjust the flow through the eductor to remove the chlorine dioxide product as generated.

Altering the shape of the premix chamber by lengthening the entry pipes is of no benefit as the reactants are kept apart in this zone. Lengthening the contact zone can be beneficial up to a certain point as the high conversion rates associated with this process are due to the ability of the reactants to premix in the substantial absence of any other fluid in amounts to significantly dilute the reactants and thereby have a quenching effect on the reaction. Lengthening the contact zone beyond that required for instantaneous reaction is unnecessary. Thus, conversion rates of from about 72% to about 97%, depending on the absence or presence of packing which serves to increase exposed surface area through mixing and to slow down the movement of the reactants through the reaction zone, are available by the practice of the instant invention. This compares to conversions of about 40% in state of the art column type reactors when high pH water and/or low chlorine dioxide generation rates are used.

When the instant apparatus and procedures are employed using a high chlorine dioxide generation rate and neutral pH diluting water, conversions to chlorine dioxide of about 97% are achieved as compared to prior art conversions of about 89% chlorine dioxide. Typically, in the practice of this invention, about 1 to about 50 gallons per hour of approximately a 25 weight percent aqueous metal chlorite solution is employed in the reaction with gaseous chlorine containing a minor amount of bleed water.

The premix chamber of the apparatus of this invention may include a contact zone that varies from less than about 1 inch to 3 feet or more. However, no advantage is obtained from the use of an extremely large premix chamber unless the capacity of the generator requires it, i.e., one half to two tons per day of chlorine dioxide, since most normal needs can be satisfied by a premix chamber having a contact zone of about 4 to about 12 inches or less in length and approximately a one half to about one and a half inch width. For example, when a "T" shaped premix chamber comprising a 4 inch piece of ¾ inch schedule 40 polyvinyl chloride with small bead packing is employed at a feed ratio of one pound (1 lb.) of sodium chlorite to one half pound (½ lb.) of gaseous chlorine, a 97% to 98% conversion or yield is obtained at a production rate of 150 pounds of chlorine dioxide per day.

It should be understood that the premix chamber of this invention is designated as such because the reactants are given a chance to react, prior to mixing with any other fluid which may dilute the reactants sufficiently to quench the reaction. To applicant's knowledge, prior art column reactors introduce the reactants in the presence of large amounts of a diluting fluid, usually water, to avoid any possible buildup of chlorine dioxide. Applicant has found that by removing the product by the eductor, the buildup of chlorine dioxide in a confined volume can be avoided as is deemed essential; yet by use of the instant invention, high conversion rates are achievable. Reference is made to column 3, line 55 of U.S. Pat. No. 4,013,761.

As is known in the art and as is illustrated in FIGS. 1 and 2 herein, eductor 11 includes an inlet 61 which is also the outlet from the premix chamber since they together form the contiguous apparatus of this invention. The two parts of the apparatus are in fluid communication for the removal of generated chlorine dioxide.

The eductor includes a horizontally disposed inlet section 12 having a nozzle 63 therein. The front tip of nozzle 63 is located substantially centrally above inlet 61 and normal thereto. Spaced apart from said tip, and downstream therefrom, is a diffuser or outlet 67. Diluted or dispersed product is discharged from eductor 11 to a place of utilization or storage as designated by the letter A showing outflow.

Any eductor compatibly sized with the premix chamber may be employed as long as it can remove the product as generated.

The metal chlorite employed as a reactant in the process of this invention may be any water-soluble metal chlorite. Preferred are alkali metal chlorites such as lithium chlorite, sodium chlorite, and potassium chlorite and alkaline earth metal chlorites such as calcium chlorite, barium chlorite, and magnesium chlorite. Alkali metal chlorites are preferred with sodium chlorite being most preferred.

A critical feature of this invention is that, compared to the prior art, the aqueous metal chlorite solutions of this invention are relatively concentrated. It is largely due to the relatively high concentrations of the metal chlorite solutions and the use of nonhydrolyzed chlorine gas that the substantially instantaneous reaction is achieved. The use of nonhydrolyzed gaseous chlorine is in contrast to many prior art processes where chlorine is first dissolved in water and becomes hydrolyzed to hypochlorous acid. In such prior art processes, chlorine is not present in the reaction zone. Prior art metal chlorite solutions have concentrations of the order of about 1 weight percent metal chlorite. The aqueous metal chlorite solutions of this invention contain about 5 weight percent to about 35 weight percent of metal chlorite and preferably about 10 weight percent to about 25 weight percent of metal chlorite. Concentrations of metal chlorite below about 5 weight percent in the reactor result in some quenching of the reaction, and concentrations of about 1 weight percent cause the reaction to proceed very slowly.

The ratio of aqueous metal chlorite solution to gaseous chlorine is ideally such that the metal chlorite and the chlorine reactants are present in approximately stoichiometric amounts. In some cases, it can be desirable to have an excess of chlorine to drive the reaction to completion. The excess chlorine appears in the generator effluent.

As stated above, when chlorine dioxide is generated by the substantially instantaneous reaction of a relatively concentrated aqueous solution of a metal chlorite and gaseous chlorine in accordance with this invention, the gaseous chlorine contains bleed water. The presence of the bleed water prevents any tendency for solid metal chloride deposits to build up on the chlorine inlet to the premix chamber. The amount of bleed water in the gaseous chlorine is just enough to prevent a buildup of solid metal chloride on the chlorine inlet but not enough to significantly dilute the reactants to thereby have a quenching effect on the reaction. The amount of bleed water in the gaseous chlorine is broadly within the range of about 0.3 to about 10.0, and preferably within the range of about 0.5 to about 5.0 grams of bleed water per gram of chlorine.

The feed rates of the reactants, i.e., relatively concentrated aqueous metal chlorite solution and gaseous chlorine containing bleed water, will vary depending on several factors. The feed rates will depend on the size of the premix chamber, the presence or absence of packing in the premix chamber, and the capacity of the eductor as well as the concentration of the metal chlorite solution. In a typical reaction according to the practice of this invention where a 25 weight percent sodium chlorite solution is employed, the feed rate of sodium chlorite solution is about 0.1 to about 50 gallons per hour; and the feed rate of gaseous chlorine containing bleed water is such as to provide about half a pound of chlorine per hour; for each pound of sodium chlorite in the solution that is fed into the premix chamber per hour.

The invention will be more clearly perceived and understood by reference to the following specific examples which are offered to illustrate the invention and which are not to be considered as limiting the scope of the invention.

EXAMPLE 1

An aqueous sodium chlorite solution having a concentration of 311.5 g/l. of sodium chlorite was educted into the reaction chamber of a chlorine dioxide generator at a rate of 188.5 ml./min. Chlorine gas was simultaneously educted into the reaction chamber at a rate of 23 g./min. Bleed water at a rate of 30 ml./min. was introduced into the chlorine feed line immediately upstream from the junction of the chlorine feed line and the check valve on the reaction chamber. The generator was allowed to run for 5 minutes, and then a sample of the generator effluent was analyzed in accordance with the procedure of Aieta, Roberts and Hernandez, *AWWA Journal,* Vol. 76, No. 1 (1984). The effluent was found to contain 1117.5 mg./l. of chlorine dioxide, 14.6 mg./l. of chlorite ion, 6.7 mg./l. of chlorate ion, and 3.2 mg./l. of chlorine. The yield of chlorine dioxide was therefore 98.3%. The generator was then allowed to run an additional straight 48 hours. There was no buildup of solid sodium chloride on the chlorine inlet to the reaction chamber. The foregoing was repeated in the absence of bleed water in the chlorine feed. A deposit of solid sodium chloride built up on the chlorine inlet to the reaction chamber, causing the chlorine feed rate to drop substantially.

EXAMPLE 2

Example 1 was repeated several times with the exception that the amount of bleed water in the chlorine stream was varied each time. The results are set forth below.

| Run | Chlorine Flow Rate | Bleed Water Flow Rate | Grams Bleed Water per Gram Chlorine | Yield ClO$_2$ |
|---|---|---|---|---|
| 1 | 23 g./min. | 10.5 ml./min | 0.46 | 95.6% |
| 2 | " | 22.0 ml./min | 0.96 | 97.0% |
| 3 | " | 50.0 ml./min | 2.17 | 97.2% |
| 4 | " | 75.0 ml./min | 3.26 | 96.7% |
| 5 | " | 93.0 ml./min | 4.04 | 96.9% |
| 6 | " | 112.0 ml./min | 4.87 | 97.5% |

In none of the above runs was there a buildup of solid sodium chlorite on the chlorine inlet to the reaction chamber.

Thus, the instant invention provides a process for the generation of chlorine dioxide by the essentially instantaneous reaction of a relatively concentrated aqueous solution of a metal chlorite and gaseous chlorine. The reaction is carried out in a generator having a mix and dwell premix chamber interconnected with a source of vacuum, preferably a venturi. The relatively concentrated aqueous metal chlorite solution and the gaseous chlorine are allowed to mix and react in the premix chamber prior to any dilution as, for example, by water or other fluid flowing through the venturi eductor to deliver the generated chlorine dioxide to storage or utilization. The process is characterized in that the chlorine feed contains bleed water in an amount below that which would significantly dilute the reactants and thereby have a quenching effect on the reaction. The presence of bleed water prevents a buildup of metal chloride on the chlorine inlet to the premix chamber.

While specific embodiments of the present invention have been shown and described in detail to illustrate the utilization of the inventive principles, it is to be understood that such showing and description have been offered only by way of example and not by way of limitation. Protection by Letters Patent of this invention in all its aspects as the same are set forth in the appended claims is sought to the broadest extent that the prior art allows.

I claim as my invention:

1. A process for the generation of chlorine dioxide comprising the steps:
   a. substantially instantaneously reacting a relatively concentrated aqueous solution of a metal chlorite having a concentration of about 5 to about 35 weight percent metal chlorite and gaseous chlorine in a reaction zone sized to permit substantially instantaneous reaction of said reactants and wherein said gaseous chlorine contains about 0.3 to about 10.0 grams of bleed water per gram of chlorine; and
   b. transferring the generated chlorine dioxide from said reaction zone to another location by continuously educting said chlorine dioxide to avoid a buildup thereof by suction generated by the movement of a diluting fluid through a venturi, the flow rate of said diluting fluid being correlated to the flow rates of the reactants to thereby avoid any buildup of chlorine dioxide in said reaction zone.

2. The process of claim 1, wherein said relatively concentrated aqueous solution of metal chlorite has a concentration of about 10 to about 25 weight percent metal chlorite.

3. The process of claim 2 wherein said gaseous chlorine contains about 0.5 to about 5.0 grams of bleed water per gram of chlorine.

4. The process of claim 3 wherein said metal chlorite is an alkali metal chlorite.

5. The process of claim 4 wherein said alkali metal chlorite is selected from the group consisting of lithium chlorite, potassium chlorite and sodium chlorite.

6. The process of claim 5 wherein said diluting fluid is water.

7. The process of claim 4 wherein said reaction zone is a "T" shaped chamber and wherein said aqueous metal chlorite solution and said gaseous chlorine containing bleed water are introduced into opposite ends thereof.

8. The process of claim 7 wherein said diluting fluid is water.

9. The process of claim 4 wherein said reaction zone is a chamber shaped like an inverted letter "F" and wherein said aqueous metal chlorite solution and said gaseous chlorine containing bleed water are introduced into the same end thereof.

10. The process of claim 9 wherein said diluting fluid is water.

* * * * *